June 28, 1960

V. P. ZIMNOCH 2,942,805

MODIFIED SPREADER AND HYDRAULIC BUFFER
AND HOLDBACK FOR CATAPULTS

Filed Aug. 27, 1959

INVENTOR.
Vincent P. Zimnoch
BY Arthur W. Collins
Attorney

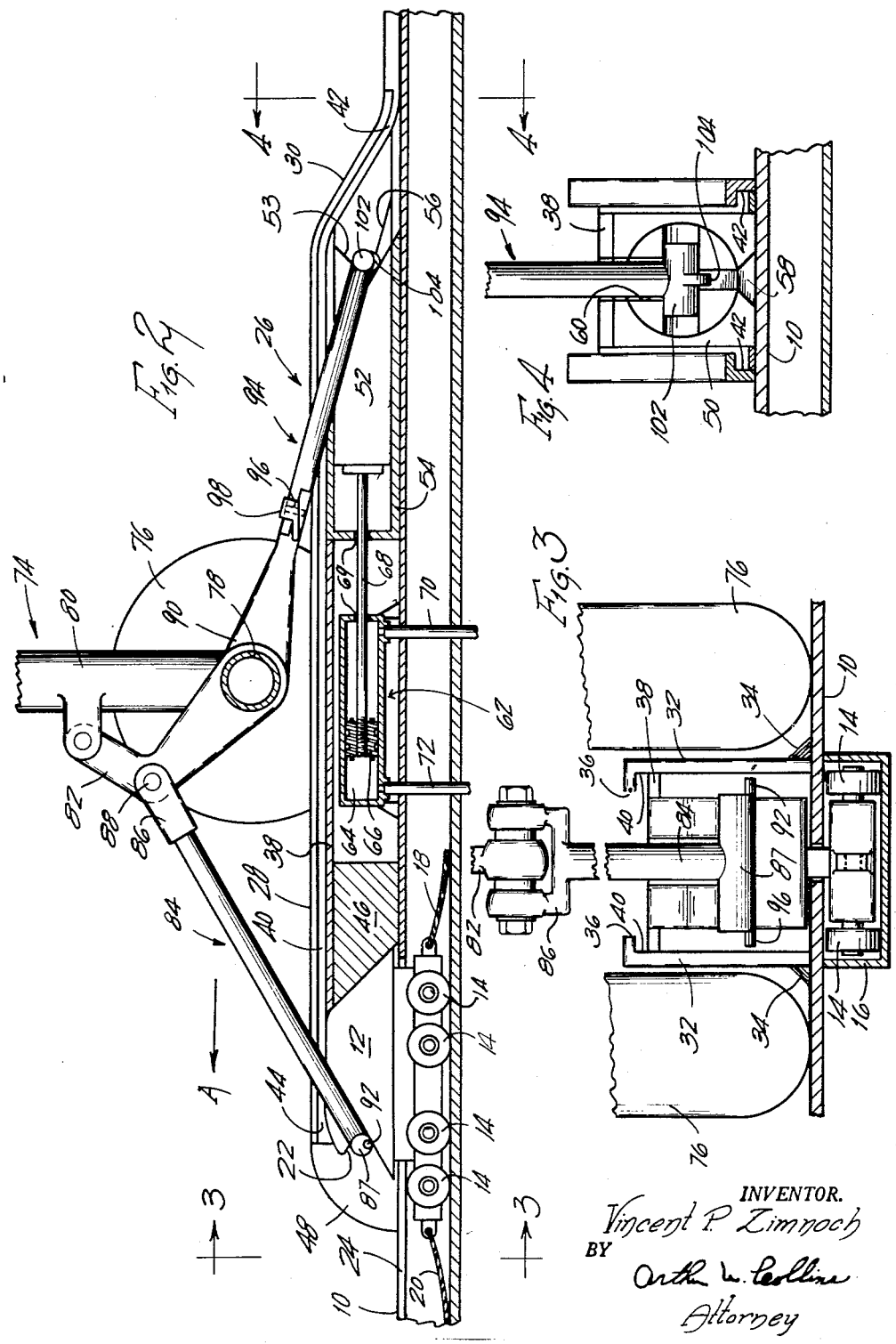

United States Patent Office

2,942,805
Patented June 28, 1960

2,942,805

MODIFIED SPREADER AND HYDRAULIC BUFFER AND HOLDBACK FOR CATAPULTS

Vincent P. Zimnoch, Haddonfield, N.J., assignor to the United States of America as represented by the Secretary of the Navy Filed Aug. 27, 1959, Ser. No. 836,559

10 Claims. (Cl. 244—63)

(Granted under Title 35, U.S. Code (1952), sec. 266)

The invention described herein may be manufactured and used by or for the Government of the United States of America for governmental purposes without the payment of any royalties thereon or therefor.

This invention relates to catapult launching systems and particularly to devices for coupling the aircraft to the catapult shuttle.

In the preparatory stages of catapult launching, the aircraft is taxied into position over the catapult shuttle and secured to it by a tow cable. Full catapult launching power is insured by temporarily restraining the aircraft with a holdback cable that secures it to the take-off surface. When full catapult power is reached, the holdback is released and the aircraft catapulted forward. The steps of positioning the aircraft over the shuttle, securing the tow and holdback cables slow-up launching to the point where it is a discontinuous, non-efficent operation. Furthermore, hazards to the operating crew are present, especially when launching jet-propelled aircraft, since they produce large amounts of noise and heat.

Accordingly, it is an object of this invention is alleviate the conditions adverted to by providing means for positioning an aircraft over a catapult shuttle and automatically coupling its undercarriage for shuttle towing and holdback.

It is also an object to provide means for tensioning the towing and holdback couplings.

It is a further object to provide such apparatus with a minimum of moving parts while imposing a relatively small penalty on the aircraft in the form of added weight and on the take-off surface by creating no large obstructions.

In the drawings,

Figure 2 is an enlarged, longitudinal section taken on line 2—2 of Figure 1, in addition showing the aircraft coupled for launching;

Figure 3 is an enlarged, cross-sectional view taken on line 3—3 of Figure 2 showing the shuttle and tow bar connected, and Figure 4 is a similar to Figure 3, but taken on the line 4—4 of Figure 2 showing the anchor and holdback bar connected.

Figure 1:
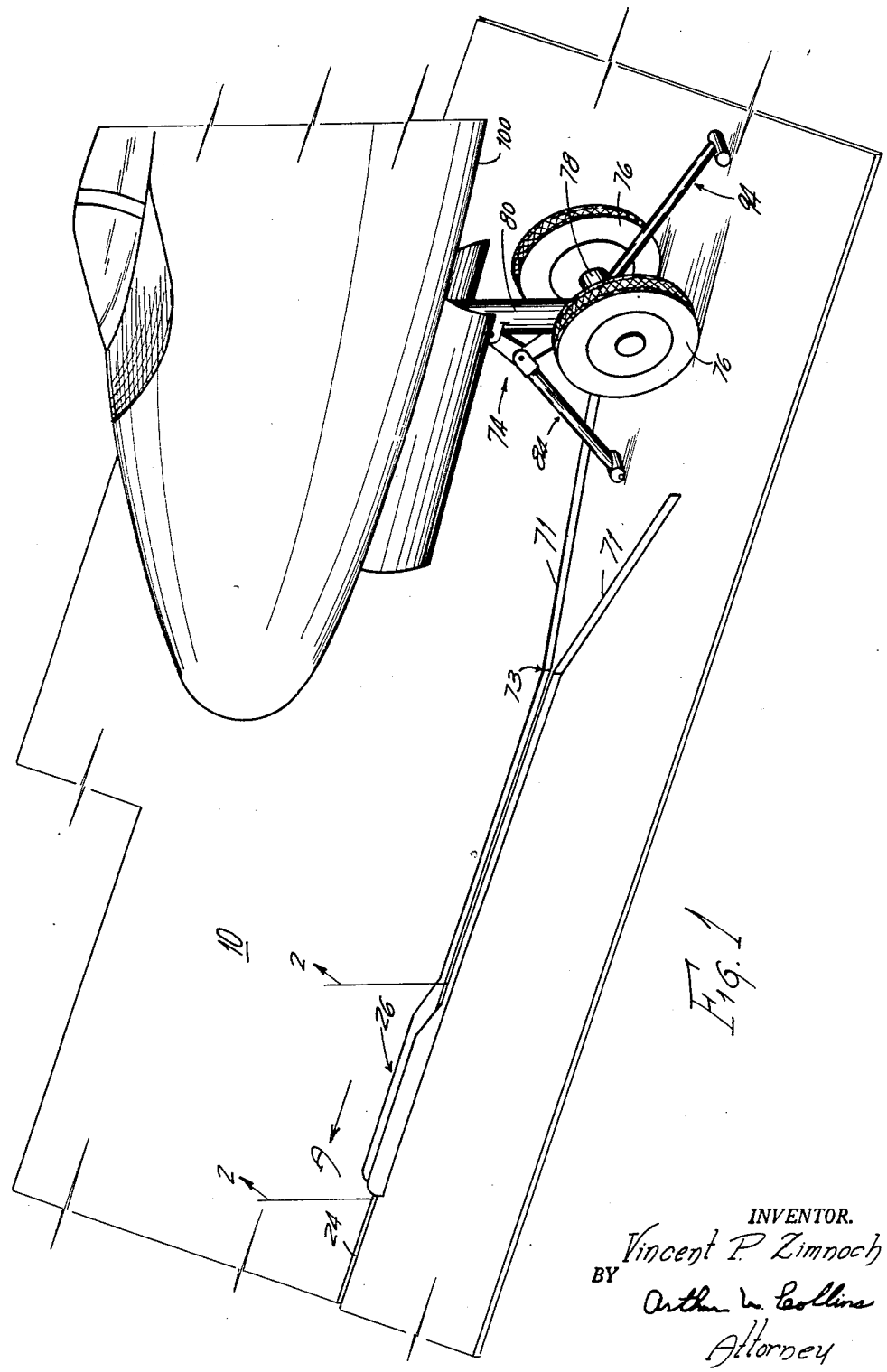
Figure 1 is a perspective view of a portion of a take-off surface and aircraft utilizing the invention.

Referring to the drawings, the invention is broadly shown to encompass a dual wheel nose gear 74 of an aircraft 100 from which are suspended a leading tow bar 84 and a trailing holdback bar 94. These are adapted for hook coupling with a shuttle 12 and a moveable anchor 52, respectively, which are mounted on a take-off surface 10. A deck track 73 and ramp 26 aid in positioning the devices in coupling relationship, whereas, a tensioner 62 chocks them securely.

In detail, the invention is designed for operation on a deck 10 of a carrier or the like not shown, in which a launching shuttle 12 is located. The shuttle is conventional and has wheels 14 so that it may be moved in a track 16 suspended from the underside of the deck when a force is applied to either of the cables, 18 and 20, which lead to a catapult engine not shown. A claw-like hook 22 extends from the shuttle above the deck 10 through an elongated slot 24. The axis of the claw is, of course, horizontal and the open side is faced forward.

On the deck 10 at the battery or readiness for launching position, the forward or launching direction being indicated by the arrow lettered "A" in Fig. 2, is a ramp 26 having a horizontal, forward portion 28 and an inclined, aft portion 30. Its sides (Fig. 3) are formed by two parallel, spaced angle irons, 32 and 32, set vertically on the edges of their webs and secured to the deck 10 by welds, 34 and 34. The flanges, 36 and 36, of the angle irons are above the deck 10 and turned toward each other. The ramp floor is a plate 38 fixed, by welds not shown, to the inner surfaces of the angle irons, 32 and 32, at a spaced distance below the flanges, 36 and 36. The floor plate height, at the forward end of the ramp 26 is at least level with the top of the shuttle hook 22; whereas, it merges into the deck 10 at the aft end (Fig. 4). Opposed, vertical slots, 40 and 40, are defined on the angle irons by the flanges, 36 and 36, and the floor plate 38 having entrances, 42 and 42, at the aft end which are at the deck level (Fig. 4) and exits, 44 and 44, up forward (Fig. 2) which are at or above shuttle hook height.

The forward end of the ramp 26 has a bumping block 46 mounted between the angle irons, 32 and 32, under the floor plate 38 which has a forward end configured to receive the shuttle hook 22 in abutting relationship. A vertical flare plate 48 secured to the forward end of each angle iron 32 projects a short distance along the deck slot 24 as an extension of the angle iron's webs.

At the aft end of the ramp (Fig. 4) the floor plate 38 is cutaway along its center line for substantially the full length of the ramp's inclined portion 30 to create an opening 50 leading into the area beneath the floor plate. An anchor 52 (Fig. 2), reciprocable along the longitudinal axis of the ramp 26, is disposed beneath the ramp floor plate 38. It is piston-like in form, having a notched or bifurcated end 53 that is directed aft and is mounted in a horizontal, open-ended cylinder 54 which is secured to the sides 32 of the ramp by screws, welds or the like, not shown. The inner surface 56 of the anchor's lower prong is tapered toward the deck 10 and has a countersunk V-shaped portion 58 (Fig. 4) that opens toward the corners of the anchor prong. The anchor's upper prong is cut through with a central, vertical slot 60 (Fig. 4).

The anchor 52 is actuated by a tensioner 62, also located within the ramp 26. The tensioner 62 has a cylinder 64 carrying a piston 66 that is connected to the anchor 52 by a rod 68 extending through holes 69 in the tensioner and anchor cylinders. Conduits 70 and 72 connect the tensioner cylinder 64 to a source of pressure (not shown) so that pressure may be supplied to either side of the tensioner piston 66 and the anchor 52 is thereby reciprocated forward and aft, as desired.

Extending aft from the ramp 26 (Fig. 1) are a pair of spaced, vertical members, 71 and 71, which define a Y-shaped deck guide or track 73. The members, 71 and 71, are secured by welds or other means not shown to the deck 10 and are substantially equal in height with the flange's 63 on the ramp angle irons 32 and 32. In effect, they extend the angle iron webs aft as is done in a forward direction by the flare plates, 48 and 48.

The nose gear 74 of an aircraft which is to be coupled for launching has conventional dual wheels, 76 and 76, mounted on an axle 78 that is connected by a strut 80 to the aircraft's fuselage 100. A vertical, V-like bracket 82 is disposed on the forward side of the nose wheel gear 74 and is secured at its ends to the strut 80 by welds, pins or other means. A tow bar 84, having a bifurcated end 86 and a T head 87 at the other end, is secured to the bracket 82 by a pin 88 passing through the bifurcated end 86 and the apex of the V of the bracket. The tow bar is of sufficient length to contact the deck 10 with its free end or T head 87 (Fig. 1). Each end of the T head 87, at a point beneath its center, has a bore carrying a guide pin 92 which is biased outwardly by a spring, not shown. The pins, 92 and 92, are engageable in the ramp slots 40 and provide a means of retaining the tow bar 84 on the ramp 26.

Secured to the back of the nose wheel gear 74, in trailing relationship with the wheels 76, is a two piece holdback bar 94; it has a shear pin 96, held in place by a clip plate 98, that joins the two parts together until subjected to a predetermined load at which time the pin is severed and the holdback bar separated into its parts. At one end 90 the holdback bar 94 is provided with some connecting means, as a sleeve, not shown, by which it is coupled to the nose wheel axle 78. This permits the holdback bar 94 to pivot vertically in substantially the same plane with the tow bar 84. The other or free end of the holdback bar 94 is a T head 102 of smaller width than that of the tow bar 84 and capable of passing through the opening 50 in the ramp's inclined portion 30. A projection 104 extends from the bottom of the holdback's T head 102 and is adapted for entering the anchor's V-like countersunk portion 58 for the purpose of guiding the holdback bar 94 into the anchor. Both tow and holdback bars, 84 and 94, are rigid members and preferably metallic or other suitable material.

In order to couple an aircraft for launching, the shuttle 12 is retracted to the battery end of deck slot 24 (Fig. 2) by a pull on cable 18 and the anchor moved forward by applying pressure through conduit 70 to the tensioner piston 66. The aircraft is then taxied in the general direction of the shuttle 12 into the open end of the V-like track 73. The tow bar 84, with its T head 87 in contact with the deck 10, is pushed ahead of the nose wheels 76; similarly, the holdback bar 94 is pulled behind the nose wheels. Contact of the tow bar T head 87 with a track member 71 steers the swivable nose wheels 76 along the member 71 toward the ramp 26. The wheels 76 negotiate the relatively low track members, 71 and 71, and straddle the ramp 26. The tow head pins, 92 and 92, enter the ramp slots, 40 and 40, and the tow bar 84 is thereby carried over the ramp opening 50. The aircraft continues to taxi until the pins, 92 and 92, exit from the slots, 50 and 50, at which time the tow bar T head 87 drops in front of or into the shuttle hook 22 between the flare plates, 48 and 48. The T head 102, on the trailing holdback bar 94 enters ramp opening 50 and is guided by its projection 104 into the anchor 52. Completion of the coupling is made by reversing the pressure in tensioner 62; that is, applying it by way of conduit 72. This extends the anchor 52 aft which results in a secure chocking of the tow bar and holdback couplings and likewise an application of the required tension to the holdback bar. With subsequent application of catapult force by way of cable 20, the holdback shear pin 96 is severed and the aircraft launched.

Obviously many modifications and variations of the present invention are possible in the light of the above teachings. It is therefore to be understood that within the scope of the appended claims the invention may be practiced otherwise than as specifically described.

What is claimed is:

1. In aircraft launching apparatus for automatic coupling of a leading, rigid tow member and a trailing holdback member suspended from an aircraft to a launching shuttle member and a spaced anchor member on a take-off surface, means on said members for making hook connections, a ramp inclined from said surface over said anchor to abut said shuttle member for guiding said tow and holdback members from said surface and arranged for dropping the tow member into coupling engagement with said shuttle member and directing said holdback member into coupling engagement with said anchor member.

2. In apparatus for launching aircraft, having landing undercarriage, from a surface provided with a launching shuttle, a depending, rigid tow member secured at one end to said undercarriage by which a launching thrust is applied to said aircraft, a depending holdback member secured at one end to said undercarriage for restraining movement of said aircraft under a predetermined thrust, a coupling ramp on said surface aligned with the launching direction and disposed at the battery end thereof, an anchor mounted in said ramp beneath the surface thereof adapted for coupling engagement with the other end of said holdback member, the forward end of said ramp being at least as high as said shuttle and adapted to be abutted thereby, the other end of said ramp tapering aft to said surface for receiving the other end of said tow member off said surface and directing it over said anchor into said shuttle, said ramp having an opening providing access to said anchor to the other end of said holdback member for engagement with said anchor.

3. The device of claim 1 wherein said anchoring member is reciprocably moveable in a forward and aft direction, and tension means mounted within said ramp connected to said anchor for movement thereof to provide tension to said tow member and anchor member when coupled for launching.

4. The device of claim 2 including a track on said surface for guiding the other end of said tow member to said ramp with taxiing of said aircraft for launching position.

5. In apparatus for launching aircraft, a launching surface, an aircraft having a wheeled undercarriage, a depending rigid tow bar and a depending holdback member each secured at one end to said undercarriage, a launching shuttle adapted for coupling with the other end of said tow bar and moveable in a direction for applying a thrust to said aircraft, a coupling ramp secured to said surface aligned with said direction and at the battery position thereof, an anchor in said ramp, said ramp tapering aft to said surface for receiving the other end of said tow member therefrom, the forward end of said ramp being as high as and adapted to receive said shuttle in abutting relationship, said ramp having a slot dimensioned to provide access to said anchor by said holdback member and to exclude said tow bar.

6. In launching apparatus, a nose wheel undercarriage, a rigid tow member secured at one end to said undercarriage for pivoting in a vertical plane and adapted to be pushed along said surface ahead of said undercarriage, a trailing holdback member secured at one end to said nose wheel and adapted to be pulled on said surface behind said undercarriage, a ramp secured to said surface, a moveable shuttle for coupling to said tow member, an anchor mounted in said ramp, and coupling means on the free ends of said tow and holdback member for coupling to said shuttle and anchor respectively.

7. In launching apparatus for aircraft a launching surface, a shuttle thereon, a swivable dual wheel nose gear on said aircraft, a rigid tow member pivotally secured at one end to said nose gear, a holdback member secured at one end to said nose gear, a ramp secured to said surface adapted to be straddled by said dual wheel nose gear and abutted at the front end thereof by said shuttle, an anchor mounted in said ramp, coupling means on the other end of said tow member adapted for hook connecting to said shuttle, coupling means on the other end of said holdback adapted for hook connecting to said anchor, an opening in the surface of said ramp over said anchor for receiving the other end of said holdback, said shuttle and anchor being spaced so as to permit coupling of the tow bar and holdback member thereto respectively with taxiing of said aircraft over said ramp.

8. The device of claim 7 including track means on said launching surface for directing said member to said ramp.

9. The device of claim 8 including means in said ramp for moving said anchor and thereby tensioning said tow and holdback members when coupled.

10. In apparatus for launching aircraft having a swivable, dual wheeled nose gear, a tow bar pivotally secured at one end to said gear for vertical movement, shuttle coupling means on the other end of said tow bar, a holdback bar pivotally secured at one end to said gear for vertical movement, a launching surface, a ramp on said surface adapted to raise said tow bar from said surface onto a shuttle and dimensioned to be straddled by said wheels, an anchor mounted in said ramp at a distance from the end thereof suitable to receive said holdback bar upon positioning of said tow bar into said shuttle the other end of said holdback adapted for hook coupling with said anchor, and an opening in said ramp providing access to said anchor by said holdback member and said other end of said tow bar being oversized therefor.

References Cited in the file of this patent

UNITED STATES PATENTS 2,862,682     Davies _____ Dec. 2, 1958

FOREIGN PATENTS 506,680     Great Britain _____ June 2, 1939